April 30, 1963  M. KAPLAN ET AL  3,087,415
AUTOMATIC COFFEE BREWER
Filed June 21, 1960  5 Sheets-Sheet 2

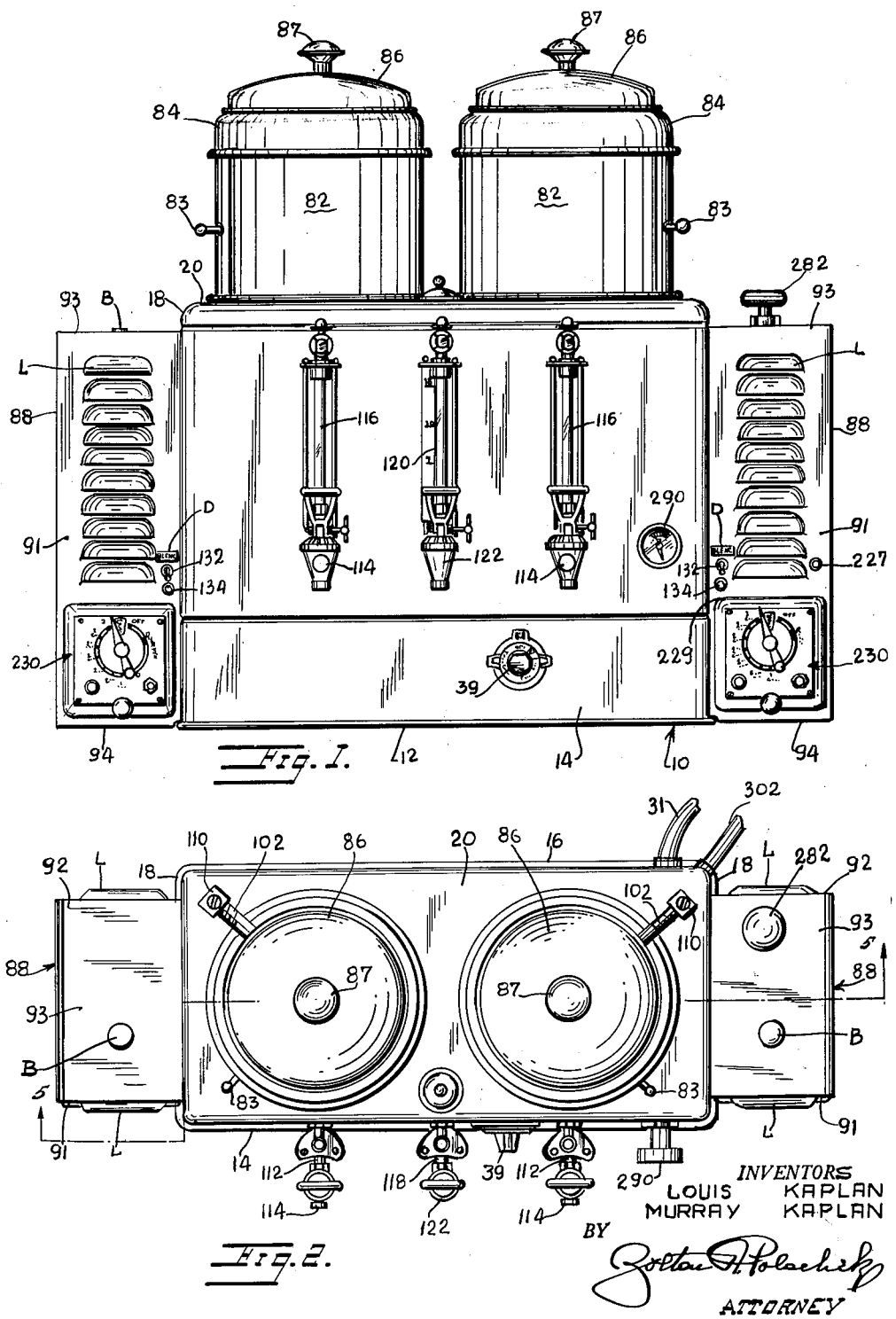

INVENTORS
LOUIS KAPLAN
MURRAY KAPLAN
BY
ATTORNEY

April 30, 1963 M. KAPLAN ET AL 3,087,415
AUTOMATIC COFFEE BREWER
Filed June 21, 1960 5 Sheets-Sheet 3
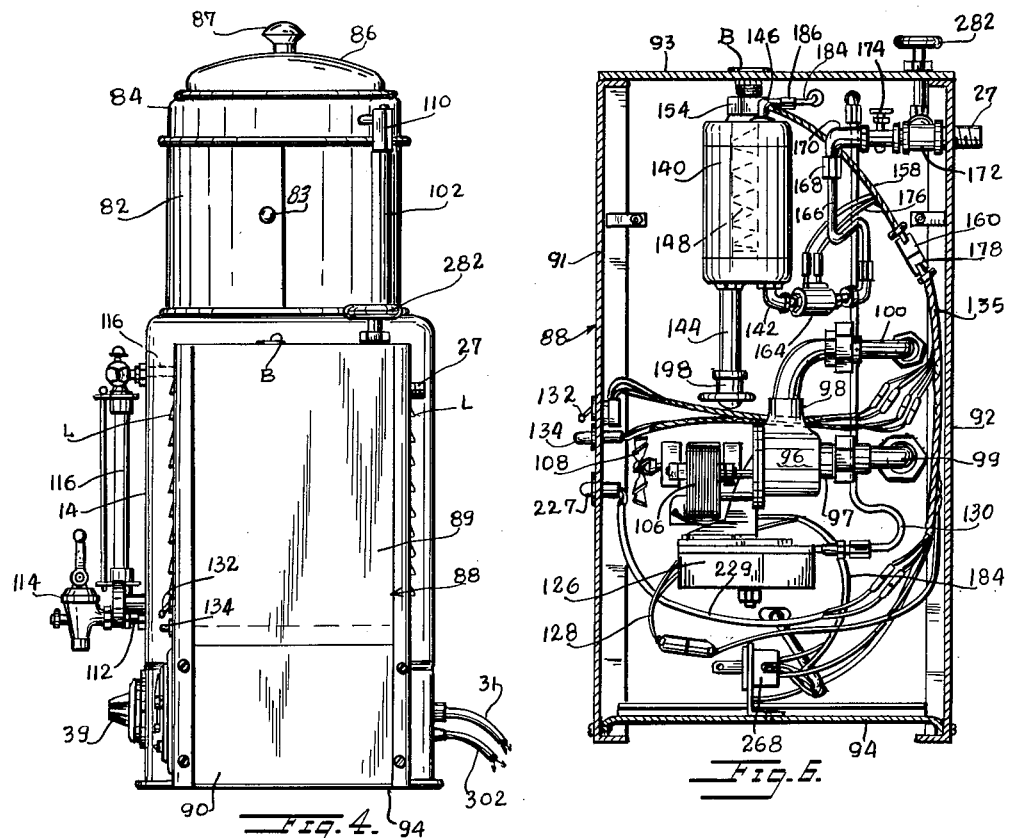
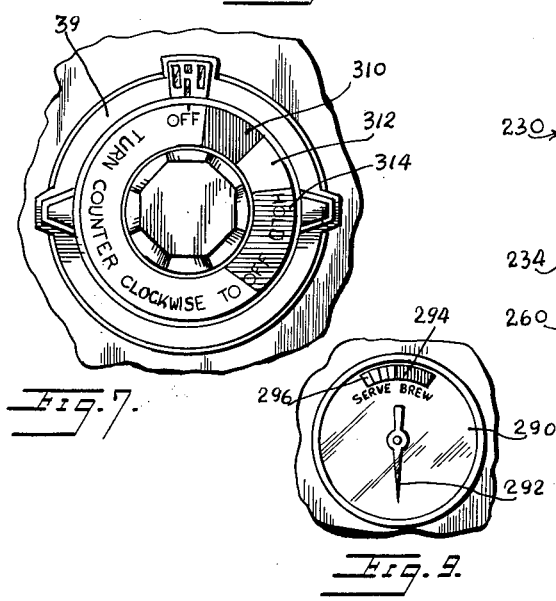
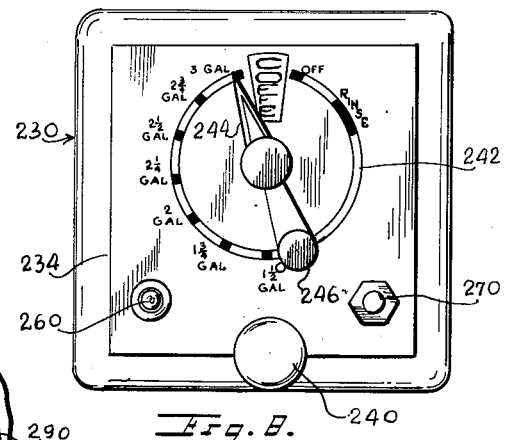
INVENTORS
LOUIS KAPLAN
MURRAY KAPLAN
BY
ATTORNEY

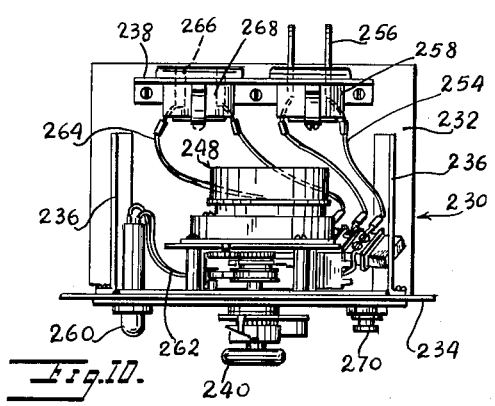
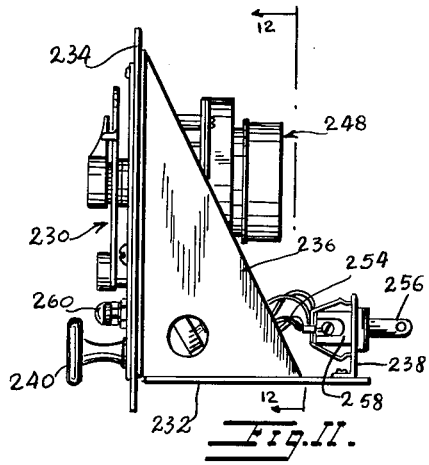
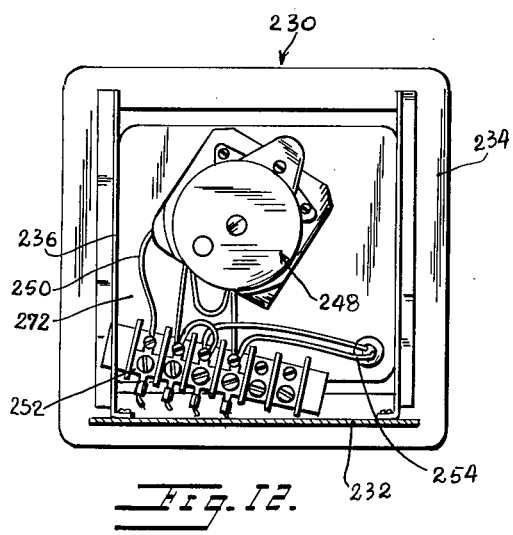
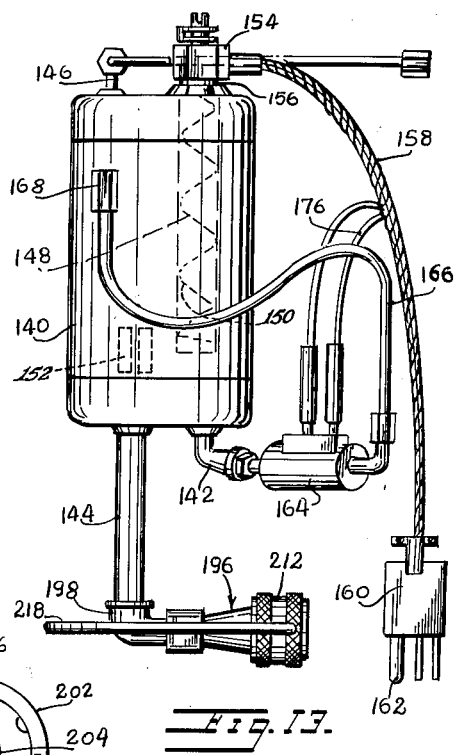
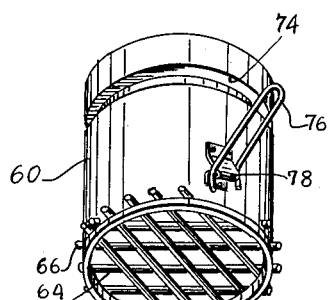
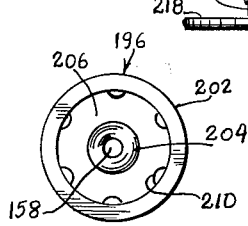
INVENTORS
LOUIS KAPLAN
MURRAY KAPLAN
BY
ATTORNEY

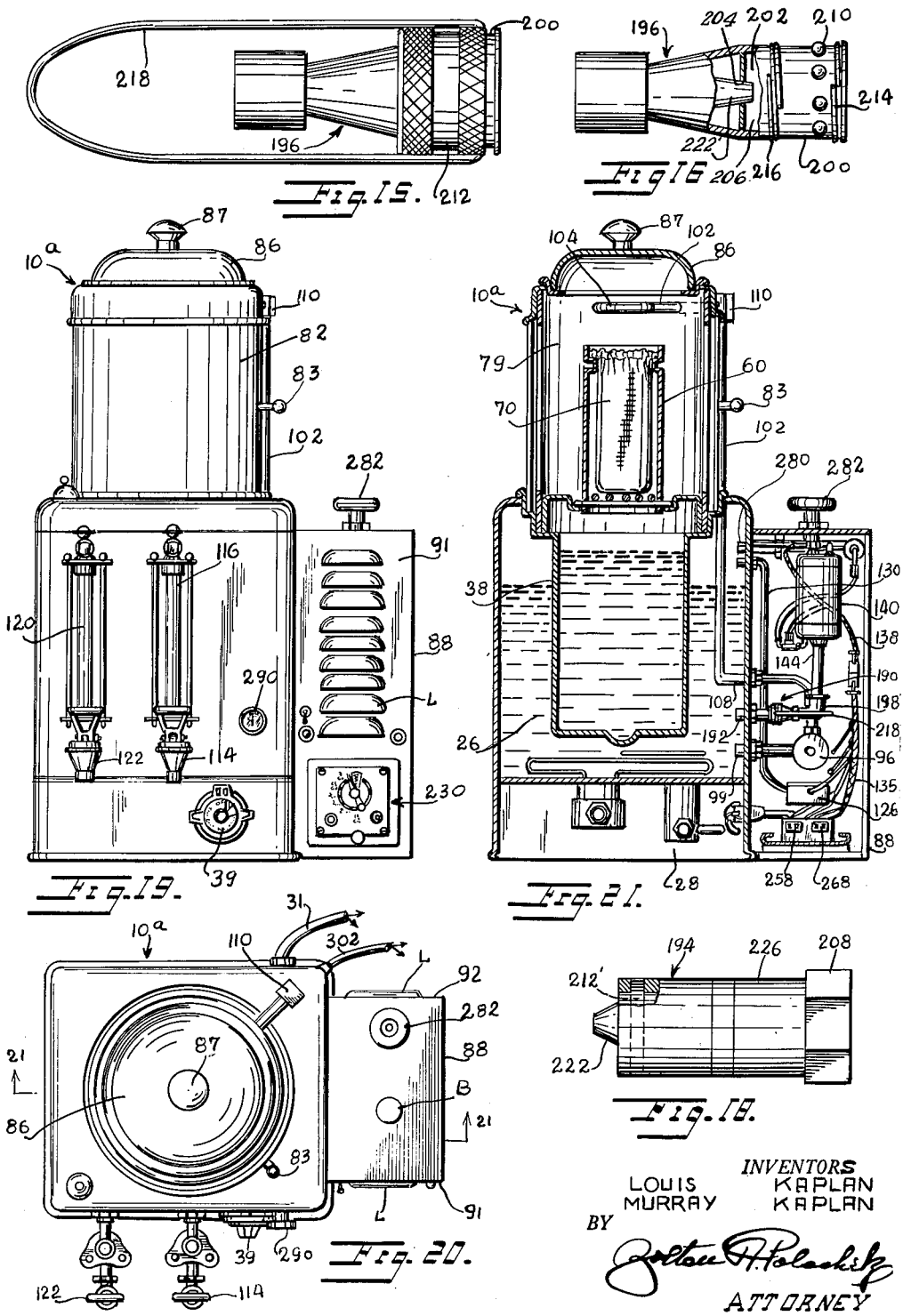

United States Patent Office 3,087,415
Patented Apr. 30, 1963

3,087,415
AUTOMATIC COFFEE BREWER
Murray Kaplan, 61 Warwick Road, and Louis Kaplan, 2 Wimbleton Lane, both of Great Neck, N.Y.
Filed June 21, 1960, Ser. No. 37,694
2 Claims. (Cl. 99—281)

This invention concerns an automatic coffee brewer for bulk brewing of coffee.

According to the invention, the apparatus embodying the invention includes an urn in which coffee is brewed. In one form of the invention, the urn has a pair of stainless steel liners or containers in which the brewed coffee is contained. The urn is provided with a cylindrical coffee basket or receptacle for each container, having a grid bottom in which a bag of ground coffee is disposed to provide a level bed of ground coffee. The grid bottom has square openings for discharging brewed coffee therethrough into the container. An automatic water refilling device is provided for keeping the urn filled with water to a predetermined level around the containers. The water refilling device includes a chamber, a heater in the chamber for heating the water therein prior to its entry into the urn, a thermostat in the chamber and a solenoid controlled valve outside the chamber but associated with the thermostat for controlling entry of water into the chamber. A brewing selector is provided for determining the quantity of water to be fed into the urn through the ground coffee in brewing coffee of predetermined strength. An electric heater is provided for heating the water around the containers. An air pump is provided for pumping air through the brewed coffee in the containers to refreshen the coffee.

A principal object of the invention, therefore, is to provide a coffee brewing urn with an automatic water refilling device.

It is a further object to provide a coffee brewing urn with an automatic water refilling device and an automatic coffee brew selector.

A further object is to provide a coffee brewing urn with air pump means for agitating and refreshing the brewed coffee.

Another object is to provide a coffee urn with an automatically controlled water rinse cycle.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a front elevational view of a coffee brewing urn embodying one form of the invention.

FIG. 2 is a top plan view of the urn.

FIG. 4 is a side elevational view, looking from the right of FIG. 1.

FIG. 6 is a side view of an auxiliary casing with the cover removed.

FIG. 7 is a front view of a thermostat control.

FIG. 8 is a front view of a brewing selector.

FIG. 9 is a front view of another brew control.

FIG. 10 is a top plan view of the brew selector of FIG. 8.

FIG. 11 is a side elevaitonal view of the selector of FIG. 8.

FIG. 12 is a rear elevational view thereof, with parts removed.

FIG. 13 is an enlarged side elevational view of the removable refilling assembly.

FIG. 14 is a perspective view of the coffee basket.

FIG. 15 is a side view of the female coupling member.

FIG. 16 is a fragmentary part sectional and part elevational view of the coupling member of FIG. 15, with the slidable sleeve omitted and parts being broken away.

FIG. 17 is an end view looking from the right of FIG. 16.

FIG. 18 is a side view of the male coupling member.

FIG. 19 is a front elevational view of a coffee brewing urn embodying a modification of the invention.

FIG. 20 is a top plan view thereof.

FIG. 21 is a sectional view on the line 21—21 of FIG. 20.

Figures 3, 5:
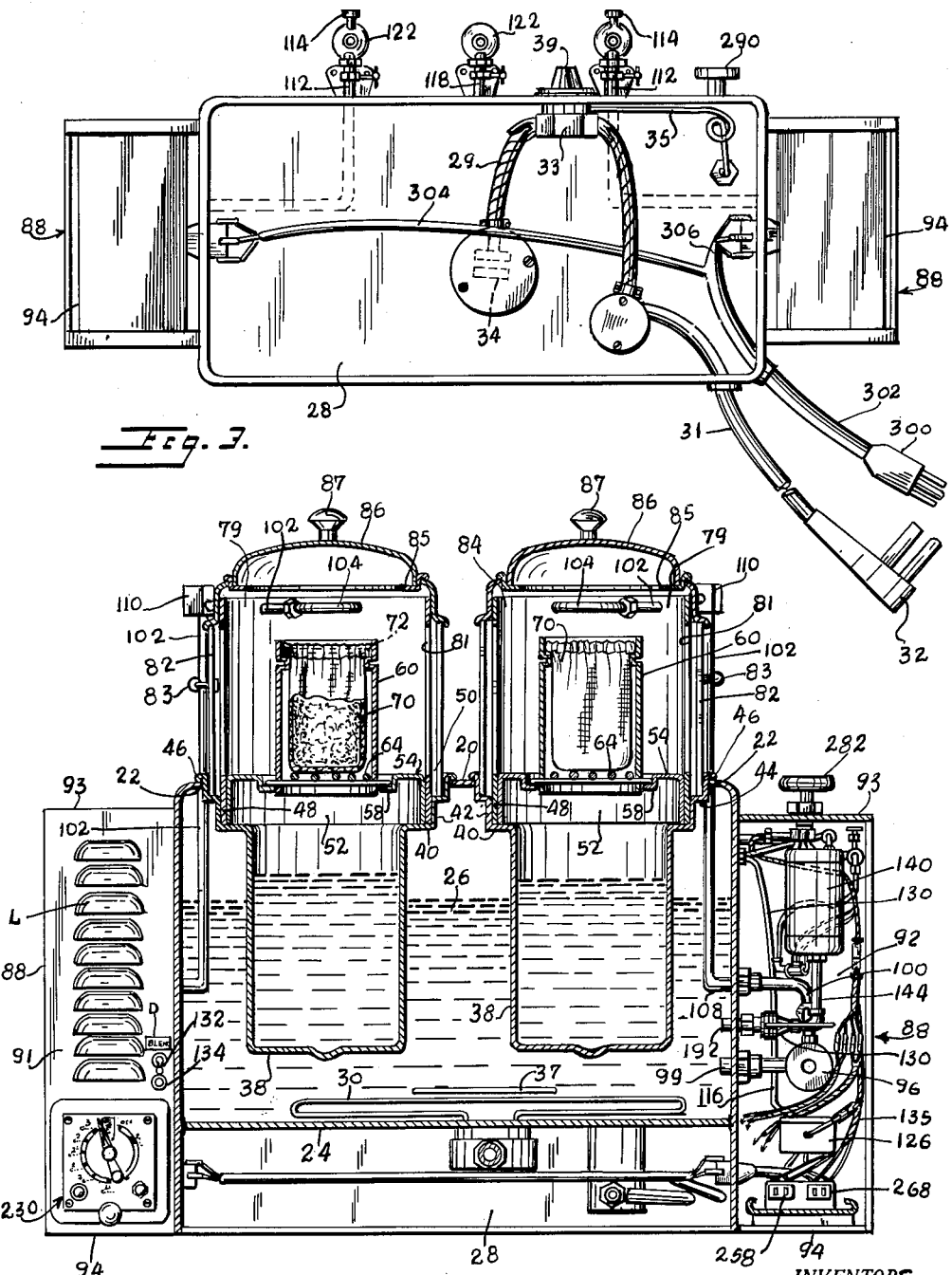
FIG. 3 is a bottom plan view of the urn.
FIG. 5 is a sectional view taken on the line 5—5 of FIG. 2, parts being shown in elevation.

Referring in detail to the drawings, in FIG. 1 there is shown an urn 10 made in accordance with one form of the invention. The urn comprises a main casing or housing 12, preferably of stainless steel having a front wall 14, rear wall 16, side walls 18, 18 and a top wall 20, and being open at the bottom. The top wall is formed with a pair of closely spaced openings 22. A horizontal wall 24 across the interior of the casing divides the interior thereof into an upper compartment 26 and a lower compartment 28. The upper compartment constitutes a water compartment or boiler. Water is supplied to the water compartment from a water supply pipe 27 shown in FIG. 6.

Suitable electric heating apparatus is installed in the urn for heating the water indicated at W in the compartment 26. This heating apparatus is shown as an electric heater including a heater coil 30 in the bottom of the compartment 26 connected by means of cables 29 and 31 and plug 32 to a source of electromotive force. A valve 33 controlled by a thermostat 34 and having a capillary tube 35 and a thermally sensitive phial 37 is connected to the coil and the cable 29. A knob 39 is provided on the valve for setting the operative temperatures of the thermostat. The valve 33 is of well known construction and therefore need not either be further illustrated or described. By reason of this valve, the water temperature of the water in compartment 26 is maintained substantially constant or at least within a range of a few degrees of a predetermined selected temperature, say 195° F. to 205° F.

It is preferred that the main casing 12 be large enough to contain two units of the brewing apparatus so that a supply of coffee may always be ready in one or the other of the units. Accordingly, a pair of spaced liners or containers 38, 38 for brewed coffee are supported by the top wall 20 around the peripheries of the openings therein, the liners or containers depending into the compartment 26. The liners or containers are formed of stainless steel. Each liner or container comprises a hollow cylindrical body closed at the bottom and open at the top. At the top, the body of the container is formed with an annular horizontal shoulder 40, a vertical flange 42, another horizontal shoulder 44 terminating in an outer horizontal flange 46. The horizontal flange 46 seats upon the periphery of the respective opening 22 in the top wall. The coffee liners or containers 38 are partially immersed in hot water W in compartment 26.

A narrow strip 48 of stainless steel lines the vertical flange 42 for half the distance around each container, at the front thereof. The strip 48, outer flange 46 and the horizontal shoulder 44 define a narrow shallow channel 50 around each opening 22 in the top wall of the casing at the front of the casing.

An annular removable bearing member 52 seats on the horizontal shoulder 40 of each liner or container 38. The bearing member has a horizontal flange 54 as viewed in FIG. 5 at the top thereof, a downwardly extending flange terminating in a horizontal shoulder 58.

The annular bearing member 52 in each container 38 supports a riser or basket 60 for holding a charge of ground coffee. The basket comprises a hollow cylindrical body of stainless steel open at both ends. A grillwork composed of crossed round wires 64 of heavy stock is mounted across the basket at one end thereof, the bottom end as viewed in FIG. 5. The ends of the wires extend through holes in the wall of the basket (see FIG. 14) and are flattened at their protruding extremities 66, for holding them against longitudinal displacement and for serving as supports for the basket upon the shoulder 58 of the annular bearing member 52 of the container. A fabric lining 70 of cheesecloth or the like is placed over the inside of the wall of the basket and over the grillwork and is held spread apart and in place by a ring 72 threaded through a loop formed in the lining by stitching at the end of the lining, the ring being snapped against the body of the basket over a shoulder 74 formed at the top end of the basket.

The lining 70 constitutes a removable bag for holding a charge of ground coffee (not shown). Ground coffee will preferably be loaded in each bag to the level of one to two inches in normal use. The grillwork provides free draining support means for the ground coffee.

The basket 60 is removably positioned over the opening in the annular bearing member 52 in each container with the flattened ends 66 of the wires 64 of the grillwork resting on the top of the flange 58 on the inner periphery of the annular bearing member 52. An elongated looped wire handle 76 (FIG. 14) is pivotally mounted on the bottom end of the basket wall by means of a looped bracket 78, the handle having angular ends serving to contact the wall of the basket and act as stops for holding the handle in horizontal position, when desired.

Each riser or basket 60 is enclosed in a housing formed of stainless steel. Each housing comprises an elongated hollow cylindrical body 79 having a cut-away portion 81 adapted to be closed by a curved sliding door 82 providing with a handle 83. The bottom end of the body as viewed in FIG. 5 is supported on and is fastened to the horizontal shoulder 40 of the liner or container 38. The bottom end of the door 82 slides in the channel 50 and is guided by the flange 46 and strip 48 (FIG. 5). An annular bearing member 84 of stainless steel is welded or otherwise suitably secured to the top edge of the body 80 forming an extension thereof. The annular bearing member supports an annular ring member 85 at the open top end thereof for supporting a removable cover 86 having a handle 87.

The mechanism for supplying the hot water W from the compartment 26 to the charge of coffee in each basket 60 will now be described. This mechanism is housed in an auxiliary housing 88 at each side of the main casing 12, adjacent the respective liner or riser 38. Each auxiliary casing 88 (FIG. 4) is formed of stainless steel and comprises a sectional side wall including a slidable upper section 89 and a slidable bottom section 90, a front wall 91, a rear wall 92, a top wall 93 and a bottom wall 94.

The adjacent side wall 18 of the main casing 12 forms the other side wall of the auxiliary casing. The front wall 91 and the rear wall 92 are both provided with air louvres L.

A water pump assembly is suitably supported in each casing 88 and includes a pump housing 96, with an inlet pipe or port 97 and an outlet pipe 98. The inlet pipe 97 is connected to a pipe 99 extending through a hole in the side wall 18 of the main casing and into the compartment 26 therein. The outlet pipe 98 is connected to a pipe 100 extending through a hole in the side wall 18 of the main casing 12 and into the receptacle 26. Inside the receptacle 26, pipe 100 is connected to a stand pipe 102 extending through a hole in the top wall 20 of the main casing 12 and extending upwardly along the housing 79 and through a hole in the wall of the housing adjacent the top end thereof where it is connected to a perforated spray head 104 positioned above the basket 60. The pump housing 96 is operatively connected to an electric motor 106 which is cooled by an electrically operated fan 108. The pump sucks the water out of the compartment 26 and forces it out through the outlet pipe 98 into the standpipe 102 and to the spray head 104. An adjustable water gage marker 110 is interposed in the stand-pipe 102 at the top thereof for adjusting the flow of water to the spray head.

Each container 38, 38 is provided with an outlet pipe 112 leading to the outside of the main casing 12 and secured to the outer end of each pipe is a faucet 114 for withdrawing and dispensing brewed coffee. A glass gauge 116 is connected at its bottom end to each outlet pipe 112 for indicating the level of the brewed coffee in the container.

A pipe 118 leading outwardly of the main casing from the receptacle 26 is operatively connected to a glass gauge 120 for indicating the level of the hot water in the receptacle. A faucet 122 on the end of pipe 118 dispenses the hot water.

An electrically actuated air pump 126 is suitably mounted in each auxiliary casing 88 for pumping air to the adjacent container 38 in the receptacle 26 for refreshening the brewed coffee in the container. The pump is energized by conductors 128 connected by cable 135 to the source of electromotive force. A conduit 130 is connected at one end to the pump and passes upwardly and through a hole in the side wall 18 at the top into the receptacle 26 and outwardly through the front wall of the main casing where it communicates with the top of the glass gauge 116. A switch 132 controls the circuit through the air pump. A pilot lamp 134 is connected to a cable 135 and becomes illuminated when the pump is in operation. This arrangement makes it possible to freshen brewed coffee which may have become somewhat heavy and flat in flavor from standing some time after brewing. The air is forced upwardly through the conduit 130 into the top of the glass gauge 116 downwardly through the gauge forcing any brewed coffee in the gauge ahead of it, and through pipe 112 into the botom of the container thereby agitating and a aerating the brewed coffee in the container and thereby blending the heavy coffee with the light coffee while freshening it.

Automatic water refilling apparatus is provided for replenishing the supply of water in compartment 26 and for keeping said water at a predetermined level. This apparatus is mounted in the right-hand auxiliary casing 88 as viewed in FIG. 1.

The refilling apparatus includes a hollow cylindrical casing 140 closed at both ends and having an inlet pipe 142 at one side of the bottom end thereof, an outlet pipe 144 at the other side thereof at the same end and an overflow pipe 146 at the top end thereof as viewed in FIG. 6. The casing constitutes a chamber 148 in which is disposed an electric water heater 150 and a thermostat 152. An adapter 154 is mounted on an outlet pipe 156 in the top wall of the casing 140 for connecting electric conductors in a cable 158 to the heater inside the casing. An electric plug 160 having prongs 162 is connected to the free end of the cable 158. An electric solenoid controlled valve 164 is interposed between the inlet pipe 142 and a pipe 166 detachably connected by means of a tubular nut 168 to an elbow joint 170 connected to a T-fitting 172 which in turn is connected to the cold water supply pipe 27. A valve 174 is inserted in the pipe 166 for controlling the flow of water therethrough. The solenoid controlled value is connected by conductors 176 to the cable 158. Plug 160 is detachably connected to a plug 178 carried by another cable 135 connected to a socket 182. A pipe 184 has one end detachably connected by means of a tubular nut 186 to the overflow pipe 146 at the top of the casing 140 and its other end passes through an opening in the adjacent side wall 18 of the main casing 12 and into the compartment 26.

A valve coupling device 190 such as disclosed in Patent 2,548,528 is interposed between the outlet 144 and an inlet pipe 192 extending through an opening in the adjacent side wall 18 of the main casing 12 and leading to the water compartment 26. This coupling device 190 includes a male coupling member 194 and a female coupling member 196.

The female coupling member 196 is threaded on an elbow 198 on the end of outlet pipe 144 and is carried thereby. This female coupling member comprises a cylindrical body portion 200 (FIG. 16) having a smooth inner bore 202 and a conical valve seat 204. Forwardly of the valve seat 204, there is a chamber 206 adapted to receive the forward extremity of the male member 194 which is threaded at its end 208 for connection with the inlet pipe 192.

The body portion 200 is provided with a plurality of holes to receive steel balls 210, the inner ends of the holes being somewhat less in diameter than the diameter of the balls in order to prevent the balls from passing inwardly through the holes when the coupling is disconnected. The balls are adapted to enter a groove 212' in the male member 194 when the members are brought into operative or connecting position.

A sleeve 212 surrounds and slides upon the exterior surface of the body portion 200 of the coupling member 196. The sleeve has an inwardly projecting annular surface adapted to engage the balls and lock them in the groove 212' when the coupling is connected. A split ring 214 is mounted in a groove in the body portion 200 of the female coupling member 196 preventing sleeve 212 from moving to the left of the position shown in FIG. 15. The sleeve is normally held in engagement with the split ring 214 by a spring 216 which bears against the body portion 200 and a shoulder on the sleeve 212.

When the coupling members are connected together, the operator retracts sleeve 212 means of a looped handle 218 formed of stout wire stock connected at the ends of the wire by soldering or the like to the sleeve 212, and extending beyond the outlet pipe 144 and elbow 198. This retraction is against the action of the spring 216 in member 196. When the sleeve 212 is thus retracted, the operator inserts the forward end of male member 194 into the chamber 202 in female member 196 by pushing the female member against and over the male member 194. During this operation, the beveled valve member 222 in member 194 cams the balls 210 and the balls are brought into line with the groove 212' after which the operator releases the sleeve 212 and the spring 216 in member 196 forces the sleeve 212 to the connecting position where the bevel member 222 of member 194 prevents the balls from leaving the groove and the two coupling members are thereby locked together in sealing condition.

Both of the coupling members are provided with valves which close when the coupling is broken and which engage each other to open up a passage through the coupling when the members thereof are brought into operative position.

Both valves in the coupling members are constructed similarly and each valve includes a spring-pressed slidable valve piece 224 seated on a valve seat 224. In female member 196, the valve piece 222' seats on valve seat 204 and projects into the chamber 206 and in male member 194 the valve piece 222 projects outwardly of the body 226 thereof.

The casing 140 and associated parts, including the female coupling member 196, constitute a unit, as shown in FIG. 13, which unit is detachably connected to the urn by the operator taking the unit and manually forcing the female member 196 over the protruding valve piece 222 of the male member 194 on the pipe and then threading the end of the tubular nut 168, carried by pipe 166 onto the end of the elbow joint 170, and by threading the end of the tubular nut 186 carried by pipe 146 onto the overflow pipe 184.

When the coupling is to be disconnected, the operator uncouples the nuts 168 and 186 and pulls on the handle 218 thereby uncoupling the coupling members 194 and 196. The top wall 93 of casing 88 is provided with an opening directly above the casing 140 when in position to permit access to the casing for adjusting the mechanism therein. The opening is plugged by a removable button B. A pilot lamp 227 connected by conductors 229 to cable 135 indicates when the refilling mechanism is in operation.

A brew selector unit 230, best shown in FIGS. 10-12, is detachably installed in each auxiliary casing 88. The brew selector units are provided to permit the operator to set the brewing time for coffee in the containers 38. Each brew selector unit comprises a base plate 232 and a front upright plate 234 braced by triangular plates 236. A short upright plate 238 is secured to the rear of the base plate. A handle 240 is provided on the front plate 234 for installing and removing the unit. A dial 242 is provided on the front face of the front plate and is graduated in quarter gallons. A pointer 244 having a handle 246 is rotatably mounted on the front plate and is movable over the dial. The pointer is operatively connected to a time controlled valve 248 mounted on the rear face of the front plate. The time controlled valve may be set to deliver any selected quantity of water to its respective casing 88 by pipe 27 in a predetermined time. The time controlled valve 248 is connected by conductors 250 through contacts 252, to conductors 254 to prong contacts 256 extending from an insulating block 258 supported on rear plate 238. A pilot light 260 projecting from the front plate is electrically connected by conductors 262, contacts 252 and conductors 264 to socket contact 266 secured in an insulating socket block 268 supported on rear plate 238. The light signals when the timer is on.

A push button 270 extends through a hole in the front plate 234 and is connected to a movable switch contact 272 on the rear of front plate 234 and connected to the time control valve 248 for controlling the circuit therethrough.

A water pipe 280 (FIG. 21) is provided at the top of the auxiliary casing 88 for supplying cold water to the compartment 26 directly in case of an emergency. One end of the pipe 280 is connected to the T-fitting 172 connected to the supply pipe 27 and the other end of the pipe extends through a hole in the side wall 18 of the main casing into the compartment 26. A valve 282 interposed in pipe 280 controls the flow of water therethrough, after the flow through pipe 166 is cut off by the valve 174.

A visual indicator device 290 is mounted on the front wall 14 of the main casing. The indicator has a pointer 292 and has an area at the top colored red as indicated at 294 with the word "brew" underneath, and an area having closely spaced red lines as indicated at 296 with the word "serve" underneath. When the pointer is pointing at the red area 294 it indicates that the apparatus is brewing coffee and when it points to the striped area 296 is indicates that the coffee is brewed and ready to be served. The indicator device is manually operated.

The power for operating the pumping and refilling mechanism in the casing 88 is supplied from a source of electromotive force such as the house supply by means of a plug 300, cable 302 and branch cables 304 and 306 connected to the socket contacts 258 and plug contacts 268 in auxiliary casings 88. The circuits through these instrumentalities are substantially completed when the selector unit 230 is inserted into its respective casing 88 and its contacts engage the contacts in the casing. It is only necessary then to actuate the switches 132 and 270.

In operation of the brew apparatus and in order to make coffee, the water W in the compartment 26 is heated to the desired temperature, for example, a selected temperature say within the range of 195° F. to 205° F. At the same time, the water in the casing 140 is heated. The pointer 244 of the brew selector 230 is first moved to "Rinse" position on the dial 242 and the button 270 is pushed to close the circuit through the timer. The water W in the compartment 26 at brewing temperature will enter the suction portion 97 of the pump 96 and will be forced through the outlet pipe 98 thereof into and through the stand-pipe 102 to the spray head 104 to enter the liner 60 at a temperature of from 195° F. to 205° F. After the light 260 has gone off, the rinse cycle will be completed by opening the coffee faucet 114 to drain out the rinse water.

A supply or charge of ground coffee (not shown) is next spread on the bag 70 of the liner 60 and the liner or riser is then placed in the compartment 79 and the sliding door 82 is then closed. The brewing is started by turning the brew selector 230 clockwise to a predetermined formula based on gallons which can range from 1 to 3 gallons per pound. The push button 270 is pushed and the bulb 260 will light up to show that the coffee urn is in operation. The water will flow through the upright pipe 102, water gauge marker 110 and spray head 104 onto the charge of coffee in the basket 60 and will extract the coffee flavor from the coffee, the brewed coffee then trickling down in a rain-drop effect through the perforations in the bottom of the basket 60 into the container 38 below to be collected therein as brewed or beverage coffee. The bulb 260 will go out when the timing cycle is complete. If two gallons were selected on the dial 242 of the timer 230, the timing cycle is approximately two minutes after the light has gone out.

The brewed coffee in the container 38 is kept heated by the water W in the compartment 26 until it is withdrawn by the faucet 114. The automatic blend switch 132 will be turned on for approximately twenty seconds so that the contents of the urn liner 60 will be completely blended by agitation. The brewed coffee is then ready to serve and the needle 292 in the indicator 290 will point to "Serve."

The automatic water refilling apparatus shown in FIG. 13, operates as follows: the cold water from the water supply pipe 27 enters through inlet pipe 166 into the chamber 148 in casing 140 and cools the thermostat 152 activating the solenoid 164. When the water in chamber 148 is sufficiently heated to activate the thermostat 152, the solenoid controlled valve 164 opens and the water is then forced into water compartment or boiler 26 of the main casing through the inlet pipe 192 as additional water enters the chamber 148, once again cooling the thermostat and repeating the previous action. This cycle causes the water level in compartment 26 to refill gradually so that the main heating element 30 in the compartment can then maintain brewing temperature during the entire brewing cycle without chilling the water and in turn the coffee. The cycling of the automatic refill valve will continue after the brewing cycle is completed until the compartment 26 is refilled to normal level, the level in the chamber 148 being the same as in the compartment 26. The water in the urn 10 is always hot enough to make a second batch of coffee by the time the first batch of coffee is used.

The thermostatic valve 33 has three positions, to wit, red as indicated at 310 being the brew setting position having a range from 195° F. to 205° F.; white indicated at 312 being the holding and serving position having a range from 180° F. to 185° F.; and blue indicated at 314 being the holding temperature of 145° F.

The described arrangement is wholly automatic in respect to the actual brewing of the coffee in that it eliminates personal judgment as to the time element involved and in respect to the quantity and rate at which water is passed through the coffee charge, these factors being wholly automatic and controlled by the size of the receptacle and the size of the discharge openings therein.

The described arrangement is also automatic in respect to the supply of water in the receptacle 26 and in respect to the heat supplied by the heater to heat the water therein and to maintain it at a selected temperature.

The modified form of brew apparatus 10$^a$ shown in FIGS. 19 and 21, inclusive, is similar to the form of apparatus 10 except that only a single brewing unit is used instead of a pair of units. In all other respects, it is the same and similar reference numerals are used to indicate similar parts throughout.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. In an automatic coffee brewing urn, a perforated open top receptacle for holding a charge of ground coffee, a source of supply of hot water, a spray device above the top of the receptacle, a pipe connecting the spray device and the source of supply of hot water, a pump interposed in the pipe for forcing a quantity of hot water into the ground coffee to extract the flavor from the coffee, a manually adjustable timer associated with the pump and settable to a plurality of settings for automatically determining different lengths of time during which times respectively a different quantity of water is pumped into the receptacle, a container below the receptacle for receiving brewed coffee from the receptacle, an outlet pipe connected at one end to the container, hot water means for heating the container, a faucet connected to the other end of the outlet pipe for withdrawing the brewed coffee from the container, a glass gauge associated with the container for indicating the level of the brewed coffee therein, a conduit between the outlet pipe of the container and the glass gauge, and an air pump associated with said glass gauge for forcing air through the gauge and through conduit to the bottom of the brewed coffee in the container and upwardly through the brewed coffee to agitate and aerate the coffee in the container and thereby to freshen the brewed coffee.

2. In a coffee brewing urn, a container for beverage coffee, a receptacle for ground coffee above said container, a pump for passing hot water through the ground coffee into the container, a quickly detachable brew selector including a manually adjustable timer controlling said pump and settable to a plurality of settings for automatically determining different lengths of time during which times respectively a different quantity of water is passed through the coffee into the container; an automatic refilling device for adding hot water to the container cyclically as water is drawn therefrom, said device including a casing having a chamber for receiving cold water from a supply thereof, a solenoid controlled valve in the chamber for controlling passage of water into the chamber, and a thermostat switch in said chamber set to activate the solenoid controlled valve to close the valve when the level of water in the chamber rises above the switch and to open the valve when the level of water falls below the switch; an air pump, and a brewed coffee level gauge connected to said container, said air pump being connected to said container via said gauge for pumping air into the container to agitate and aerate the brewed coffee therein and thereby to freshen the brewed coffee.

References Cited in the file of this patent

UNITED STATES PATENTS

| | | |
|---|---|---|
| 1,387,128 | Cowan | Aug. 9, 1921 |
| 1,388,636 | Frautnick | Aug. 23, 1921 |
| 2,667,827 | Peters | Feb. 2, 1954 |
| 2,706,444 | Chaplik | Apr. 19, 1955 |
| 2,725,008 | Okie | Nov. 29, 1955 |
| 2,730,034 | Svendsgaard | Jan. 10, 1956 |
| 2,745,334 | Schwall | May 15, 1956 |
| 2,748,689 | Rotman | June 5, 1956 |